United States Patent [19]

Agsten

[11] 4,261,147
[45] Apr. 14, 1981

[54] HYPERBOLIC NATURAL DRAFT COOLING TOWER CONSTRUCTION

[76] Inventor: Carl F. Agsten, 1539 Bedford Rd., Charleston, W. Va. 25314

[21] Appl. No.: 944,309

[22] Filed: Sep. 21, 1978

[51] Int. Cl.² .................. E04G 11/04; E04G 21/00
[52] U.S. Cl. ................................. 52/245; 52/432; 52/483; 52/745; 261/DIG. 11
[58] Field of Search ............... 261/DIG. 11, 111; 52/84, 245–249, 375, 431, 432, 483, 745

[56] References Cited

U.S. PATENT DOCUMENTS

| | | | |
|---|---|---|---|
| 1,153,205 | 9/1915 | Edwards | 52/245 |
| 1,954,891 | 4/1934 | Ross et al. | 52/483 |
| 2,043,697 | 6/1936 | Deichmann | 52/432 X |
| 2,177,264 | 10/1939 | Relihan | 52/432 |
| 2,664,740 | 1/1954 | Cochrane | 52/583 |
| 2,794,336 | 6/1957 | Ballou | 294/89 |
| 3,216,163 | 11/1965 | Carew | 52/169 |
| 3,300,943 | 1/1967 | Owens | 52/745 |

FOREIGN PATENT DOCUMENTS 797413  7/1958  United Kingdom ............ 261/DIG. 11

Primary Examiner—J. Karl Bell
Attorney, Agent, or Firm—Harvey B. Jacobson

[57] ABSTRACT

A veil section of a hyperbolic natural draft cooling tower is constructed on a lintel beam in the form of a closed planar curve provided with anchors spaced about the perimeter of the lintel beam for facilitating connection to the lintel beam of upstanding peripherally spaced column sections between which preformed panels are attached to fill the spaces between the spaced columns. Once the panels are affixed to the columns, the latter, as well as the adjacent portions of the adjoining panels, are encased in a cementitious material such as concrete. Additional sections of columns and panels are erected above the initial veil section by the same process as the latter in order to complete the veil. Vertically adjacent veil sections are attached to one another by connection of the columns in end-to-end relationship.

11 Claims, 5 Drawing Figures

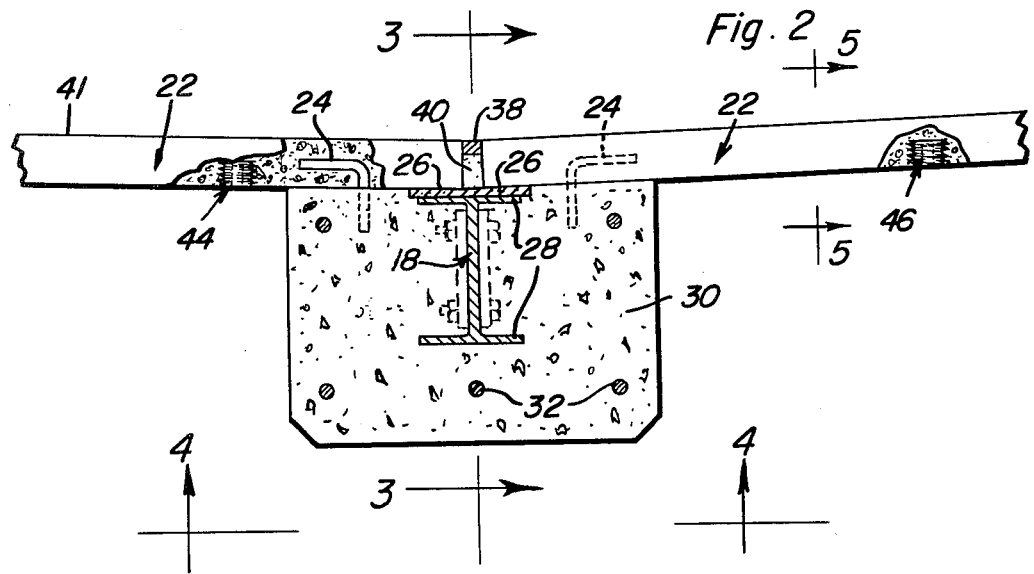
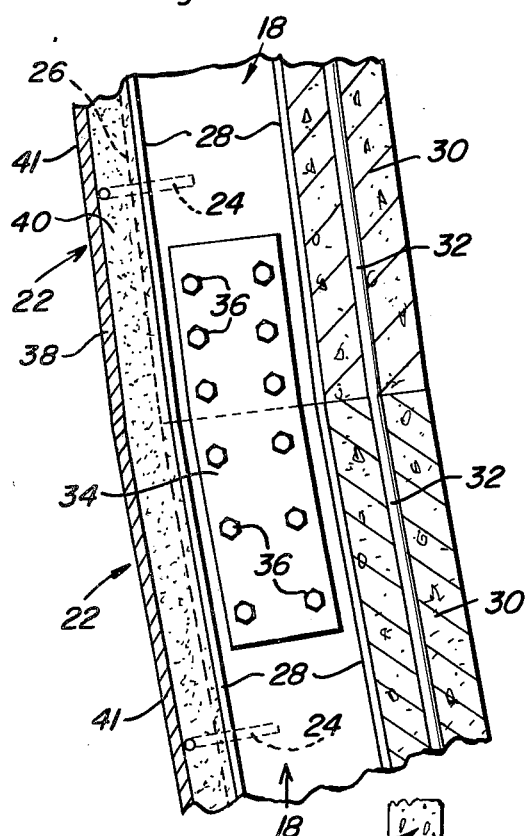
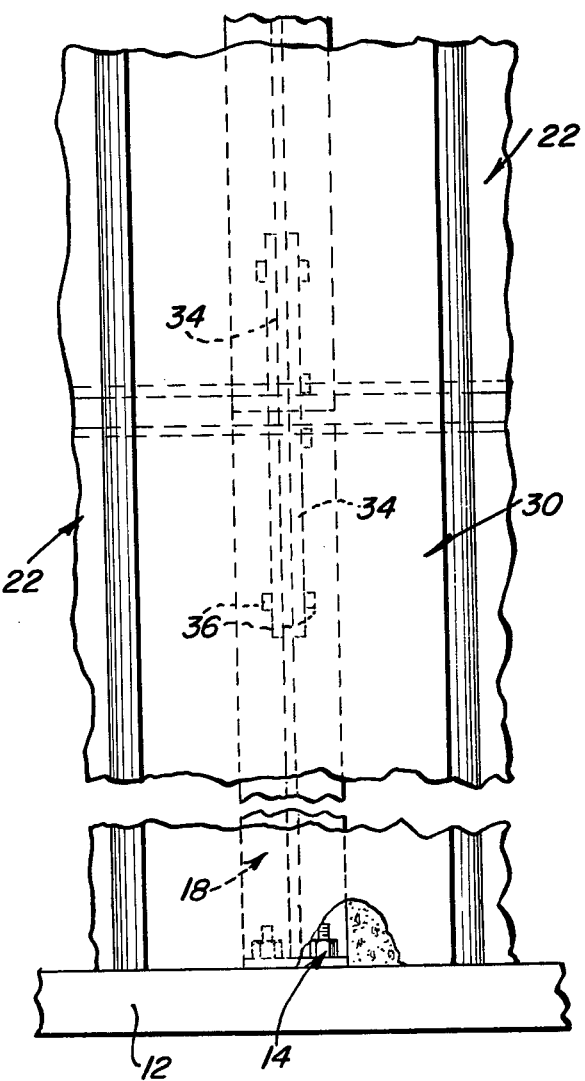
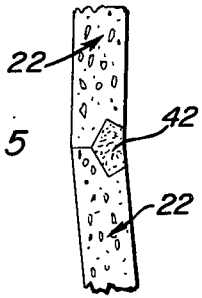
Fig. 2
Fig. 3
Fig. 4
Fig. 5

HYPERBOLIC NATURAL DRAFT COOLING TOWER CONSTRUCTION

BACKGROUND OF THE INVENTION

1. Field of the Invention

This invention relates generally to construction techniques employing prefabricated modules, and particularly to the construction of the veil section of hyperbolic natural draft cooling towers.

2. Description of the Prior Art

Hyperbolic natural draft cooling towers are generally, but not necessarily exclusively, constructed in conjunction with fossil fuel, nuclear energy, and the like, electrical generating power plants and similar facilities. It is known to construct up draft towers, cross draft towers, and other known flow systems within a structure in the form of a hyperbolic veil, with only the lower portion of the towers, that portion below and including the lintel beam, being effected to achieve the different flow systems.

The current, or conventional, method of constructing these hyperbolic veils is to use cast-in-place concrete, heavily reinforced with steel reinforcing bars. The veil sections are, from their hyperboloid form, thick at the bottom thereof and taper into thin sections at the throat of the tower, subsequently increasing in thickness from the throat to the top of the structure.

One of the most expensive and time-consuming tasks in building a veil by the conventional method is in the formwork for the cast-in-place concrete. The forms must be built on both sides of the wall of the veil, and the constantly changing circumference of the structure and thickness of the wall requires complicated modifications of the forms and tedious layout work. Further, this expensive operation is not a permanent part of the end product, but only a means to the end.

The following prior patents are believed pertinent to this invention:

| | |
|---|---|
| 1,153,205 | September 14, 1915 |
| 1,954,891 | April 17, 1934 |
| 2,177,264 | October 24, 1939 |
| 2,664,740 | January 5, 1954 |
| 2,794,336 | June 4, 1967 |
| 3,216,163 | November 9, 1965 |
| 3,300,942 | January 31, 1967 |
| 3,300,943 | January 31, 1967 |
| 3,322,409 | May 30, 1967 |
| 3,618,277 | November 9, 1971 |
| 3,764,121 | October 9, 1973 |
| 3,779,523 | December 18, 1973 |
| 3,801,076 | April 2, 1974 |
| 3,834,681 | September 10, 1974 |
| 797,413 (Great Britain) | July 2, 1958 |

SUMMARY OF THE INVENTION

It is an object of the present invention to provide a construction especially suited for natural draft cooling towers of hyperboloid design which is faster, safer, less expensive, and more conservative in the use of materials, many of which are expensive and may be in limited supply, than the conventionally employed techniques for constructing structures of this kind.

It is another object of the present invention to provide a hyperbolic natural draft cooling tower construction that permits advance prefabrication of most of the components in such form as to be easily stored and readily transportable to erection sites.

It is a further object of the invention to provide a cooling veil section constructed in such a manner that many of the construction operations therefor may be carried out on the ground enabling such operations to be more safely and inexpensively preformed and with the remaining "in air" operations carried out on the exterior, only, of the tower wall.

It is still another object of the present invention to provide a design concept and construction method for constructing the veil sections of hyperbolic natural draft cooling towers wherein the construction of the lower portion of the towers so constructed, that portion below and including the lintel beam, are not effected so that any tower design which indicates a hyperbolic veil may be constructed according to the invention.

These and other objects are achieved according to the present invention by providing a hyperbolic natural draft cooling tower construction formed by: a lintel beam in the form of a closed planar curve having a plurality of first anchors and forming a base of the hyperbolic veil; a first section of spaced columns arranged affixed to the first anchors of the lintel beam and extending therefrom at a common angle, a plurality of further sections of spaced columns, each section connected to adjoining columns so as to form substantially continuous columns throughout the structure, the further sections arranged extending away from the first section of columns and from the lintel beam and oriented for forming a hyperbolic veil; a plurality of preformed panels arranged filling-in the spaces between the columns, the panels having second anchors thereon arranged extending therefrom at spaced, substantially upright edges of the panels; fastening devices provided on the panels along the aforementioned edges thereof for permitting attachment of the panels at predetermined angles with respect to the columns with the fastening devices embedded in the concrete of the panels and the latter cured and at full strength at the time the fastening devices are employed; and a cementitious material encasing the steel columns lending compressive strength to same and providing protection to the steel from oxidation and corrosion. Thus, the erecting columns, which are advantageously structural steel members such as, for example, conventional wide flange sections, are not only employed as erection aids, but also as permanent, concrete encased structural elements working in both compression and tension as various forces are applied to the hyperbolic, or similar, veil.

The fastening devices are advantageously in the form of wedges having predetermined included angles and arranged along the spaced, substantially upright edges of the panels with the tapered portions thereof pointing toward the edge of the panel associated with a particular one of the wedges. By thus casting the wedges into the panels when same are prefabricated, the panels may be attached to the, for example, flanges of the columns in a conventional manner, such as by welding. Alternatively, a flat plate (not shown) could be cast in the panel and the wedge, for example, welded to the flat plate.

The joints formed between the columns and between the panels are preferably filled with a suitable sealing material. More specifically, it is contemplated that the horizontal joints between the panels defined by horizontal edges of the panels are provided with specially grooved configurations in section and a conventional sealing material such as a grout. Further, the vertical joints between the panels can be, for example, partially filled with a grout and retained by a compressive steel onstructed from a suitable, known material.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a fragmentary, sectional view taken generally along the line 2—2 of FIG. 1, but drawn to a larger scale and showing details of a preferred construction.

FIG. 3 is a fragmentary, sectional view taken generally along the line 3—3 of FIG. 2.

FIG. 4 is a fragmentary, elevational view taken generally in the direction of the arrows 4—4 shown in FIG. 2.

FIG. 5 is a fragmentary vertical sectional view taken generally along the line 5—5 of FIG. 2.

DESCRIPTION OF THE PREFERRED EMBODIMENTS

Figure 1:
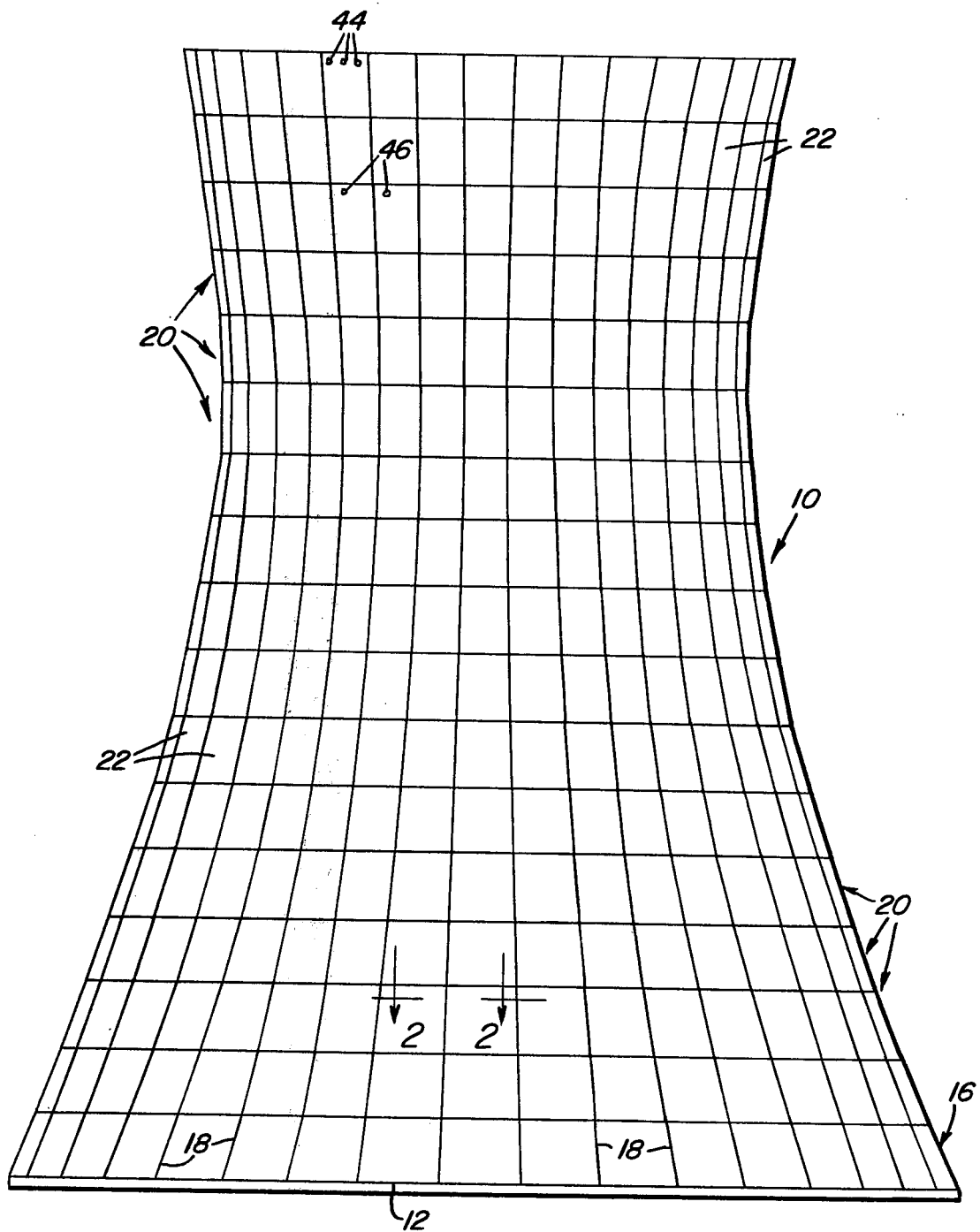
FIG. 1 is a schematic, side elevational view showing a hyperbolic veil constructed according to the present invention.

Referring now more particularly to FIG. 1 of the drawings, a hyperbolic natural draft cooling tower constructed according to the present invention has a veil section 10 built on a lintel beam 12 having the form of a closed planar curved member, such as a circular or elliptical band, and provided with a plurality of anchor bolts 14 (FIG. 4). The foundation upon which beam 12 is placed is conventional and well known to those involved in the particular art, and accordingly will not be described herein. Lower column sections 16, perhaps 20 feet or more tall, are affixed to lintel beam 12 by means of the aforementioned anchor bolts 14 to form the lower ends of columns 18, with the column sections 16 arranged extending from beam 12 at predetermined angles. As will be appreciated, when beam 12 is in the form of a, for example, ring, column sections 16, will be disposed in radial planes of the ring when the ring is viewed in plan.

A plurality of further upper column sections 20 of the spaced columns 18 are connected to the uppermost ends of sections 16 of columns 18 and are arranged extending away from sections 16, and beam 12, in such an orientation as to form a veil in the shape of a hyperboloid.

A plurality of preformed panels 22 are arranged filling-in the space between columns 18 of the sections 16 and 20. Although panels 22 are designated by a common reference numeral, it will be understood that these panels will have varying size and configuration in plan in accordance with their predetermined positions in the resulting veil 10.

Referring now more particularly to FIGS. 2 through 4 of the drawings, precast panels 22 are each provided with, for example, a plurality of anchors 24, which may be in the form of the illustrated angled reinforcing bars, arranged extending from a common surface of panels 22 at spaced, coextending edges of the panels. Wedges 26 are advantageously similarly cast into and provided on the same surface of panels 22 from which anchors 24 extend, and are arranged along the aforementioned edges of the panels 22 for permitting attachment of the panels at predetermined angles to the columns 18. This attachment may be achieved by, for example, welding wedges 26, which are advantageously constructed from a suitable metal such as steel, to the, for example, flanges 28 of columns 18. As illustrated, columns 18 are advantageously constructed from conventional steel structural wide flange sections, and the like. Alternatively, wedges 26 could be pre-welded to flanges 28 and subsequently welded to flap plates (not shown) cast into panels 22. Concrete piers 30, and the like, are used to encase columns 18, and anchors 24, once panels 22 have been attached to columns 18 as by the aforementioned welding of wedges 26 to the flanges of the columns. As will be appreciated, reinforcing bars 32 may be arranged extending parallel to columns 18 within the forms (not shown) used to retain the cementitious material forming the concrete piers 30 until the concrete is set so as to reinforce the concrete in a known manner.

Panels 22 are advantageously constructed in a conventional manner from concrete, and the like, and the wedges 26 and anchors 24 are cast into the concrete as same is poured and set. Further, the panels 22 will have a generally, for example, trapezoidal configuration in plan, with the panels being of necessity constructed for a certain section, or vertical row, in a given size of veil 10.

Column sections 18 and 20 may be connected to one another end-to-end with it being understood that the adjacent ends of the column sections will be cut at a predetermined angle in order to give the uppermost section the proper orientation for forming a hyperboloid, as by the illustrated splice plates 34, which may also be constructed from a suitable steel, attached to the webs of the adjoining column sections 18 by a plurality of connection bolts 36. In this manner, the column sections 18 may be connected to one another at any appropriate angle desired.

The vertical joints formed by a slight separation between the aforementioned spaced, codirectional edges with which anchors 24 and wedges 26 are associated is advantageously partially filled by a suitable mortar material such as grout. A compressive seal 38, such as a suitable rubber based compound, provides a seal between grout 40 and the inner surfaces 41 of panels 22. Further, grout 42, and the like, advantageously fills the space between the other set of spaced, codirectional edges of panels 22, those edges perpendicular to the first-mentioned spaced, coextending edges with which anchors 24 and wedges 26 are associated. The other set of edges forms the dividing lines between the sections 16 and 20, and accordingly extend in generally horizontal planes. As can be seen from FIG. 3 of the drawings, the other edges of panels 22 are provided with grooves adjacent the inner surfaces 41 of the panels for creating grout key edges continuously around veil 10.

The structural steel members forming columns 18 can be fabricated in 20 foot lengths, for example, and will vary in size. The function of these structural members is twofold. First, they must support the precast panels 22 in each, for example, 20 foot high "lift" prior to the placement of the poured-in-place concrete and reinforcing bars. This support function makes it necessary that the column splices between the structural members be sufficiently rigid to resist forces imposed thereon. Toward this end, the aforementioned splice plates 34 are employed. Not only may an adequate number of connecting bolts 36 be used to secure the splice plates 34 to the web of the structural members forming columns 18, but the bolts 36 may be used in combination with welding (not shown) depending on the moment to be resisted at the splice. Secondly, the steel column will serve as the major reinforcing component in the composite column ultimately provided, and it will lend tensile strength to the composite column to resist uplift, or overturning, forces.

The precast, or prestressed, concrete, and the like, panels 22 must have three structural qualities: (1) panels 22 must support themselves for handling and hauling; (2) panels 22 must withstand wind loads during erection and after completion of the entire veil 10; and (3) panels 22 must have sufficient compressive strength horizontally to form a "compression ring" at each "lift" when the ring is completed. By "compression ring" is meant a closed, curved structure capable of sustaining compression forces thereon, and by the word "lift" is meant the height of each section 16, 20. When the ring formed by each section is completed, it is not necessary that the ring carry the vertical accumulative compressive load of their weight, since the slabs, or panels, will be supported at both ends and those compressive loads will be transferred to the composite columns discussed above. Above the throat, the rings become tension rings, and can be pre-stressed in a known manner.

The thickness of the panels 22 and the reinforcing required thereof will depend upon a structural analysis of the forces to be resisted by the panel, the span between the columns, and the strength of the concrete to be used. Since such structural analysis is well known and commonly employed by those skilled in the structures art, it will not be discussed herein. If the maximum span between columns 18 is, for example, 30 feet or less, however, it is expected that 6 inch thick slabs would be the maximum required for panels 22, and that 4 inch slabs would suffice in the shorter span conditions if pre-stressing, achieved in a known manner, is used.

The height of panels 22 can be determined by, for example: (1) the method of producing the panels 22; (2) the allowable width for the mode of transportation to be employed—that is, truck, rail, or on-site manufacture; and (3) the lifting capacity of the equipment to be used for erection.

All of the components except the cast-in-place concrete pier 30 portion of the composite columns are to be prefabricated in advance and would be ready at the site or in holding yards to allow speedy erection when construction begins.

The projection of the composite columns should be treated as a design feature and in the final sizing for each tower condition, size, wind-loads, and the like, a proportion of the width to the thickness of the columns could be selected that would enhance the aesthetic appearance of the tower. Further these columnar protrusions, or "fins", will act as spoilers to minimize differential air pressures on the windward and leeward sides of the tower.

A veil 10 according to the invention is advantageously constructed by preforming concrete panels 22 with anchors 24 extending therefrom at spaced, coextending edges of the panels 22, a lintel beam 12 is arranged at the base of the veil 10 to be constructed, and is provided, as stated above, with anchor bolts 14, and the like, so that columns 18 may be set on the lintel beam 12. Next, a ring of panels 22 is placed around the entire perimeter of lintel beam 12, with panels 22 being attached to columns 18 by wedges 26 as by welding wedges 26 to flanges 28 of the columns 18. While single panels 22 may be employed with 20 foot, for example, height to reach the top of the "lift" of the columns 18, it will be understood that a plurality of panels 22 may be used so as to form a plurality of rings in each section 16, 20. Once the ring or rings of panels 22 has reached the top (or slightly below the top) of the respective sections 16, 20, forms (not shown) are placed for the concrete encasement of columns 18 up to a height just below the top of the columns 18 to allow for the connection of the next column section. The construction of such forms is known per se, as is the manner of placing reinforcing bars 32 within the form so as to, for example, extend longitudinally with the columns 18. After the concrete, and the like, has been poured into the forms and permitted to set, the columns 18 of the next section 20 may be connected to the top of the columns 18 of the just finished section as by splice plates 34 and connection bolts 36. The veil 10 is now completed by repeating the aforementioned procedure until a sufficient number of sections is obtained. The angles of the columns 18 will of course vary from section to section so as to create the desired hyperboloid configuration of the resulting veil.

An advantageous feature of the present invention provides scaffold anchoring inserts 44 in panels 22 as can be seen in FIG. 2 of the drawings. Brace mounting inserts 46 for holding columns 18 aligned until panels 22 are attached to columns 18 are also advantageously provided in panels 22. In this manner, scaffolding can be similar to that conventionally used in known construction techniques and would be anchored into inserts 44, which are embedded in full strength concrete, as well as in the poured-in-place columns in a manner not shown. Inserts 46 would allow the use, if needed, of adjustable temporary braces (not shown) to attach to columns 18 to hold them aligned until panels 22 were welded in place.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A method for constructing the veil section of a natural draft cooling tower, comprising the steps of:
   (a) preforming cementitious panels having inner and outer sides, opposite generally parallel edge portions and anchors projecting outwardly from the panels along the opposite generally parallel edge portions thereof;
   (b) providing a base of the veil to be constructed;
   (c) setting a plurality of lower column sections on the base in spaced relation about a generally circular area of the base;
   (d) placing panels formed in step (a) around the perimeter of the base with each panel at least substantially spanning the distance between a pair of adjacent column sections set in step (c) and adjacent edges of adjacent panels overlapping the inner side of the corresponding column set in step (c) and with the anchors of adjacent parallel panel edge portions provided in step (a) spaced outwardly from opposite sides of the corresponding column section, said opposite parallel edge portions of said panels extending along adjacent column sections and with the panels extending at least near to the top of the adjacent column sections;

(e) attaching the panels to the adjacent column sections;

(f) forming piers of cementitious material about the columns on the outer sides, only, of the adjacent panels with the anchors of step (a) embedded in the cementitious pier material, thereby connecting adjacent panels about said perimeter and said column sections and adjacent panels with said cementitious piers;

(g) erecting upper column sections extending from the column sections of step (c);

(h) repeating steps (d) through (g).

2. A method as set forth in claim 1, wherein step (f) includes the steps of positioning forms about the last erected column sections and extending the forms to a height just below the top of the column sections for allowing the next higher column sections to be connected to the encased column sections.

3. A method for constructing the veil section of a natural draft cooling tower, comprising the steps of:
(a) preforming cementitious panels having inner and outer sides, opposite generally parallel edge portions and anchors projecting outwardly from the panels along the opposite generally parallel edge portions thereof;
(b) providing a base of the veil to be constructed;
(c) setting a plurality of lower column sections on the base in spaced relation about a generally circular area of the base;
(d) placing panels formed in step (a) around the perimeter of the base with each panel at least substantially spanning the distance between a pair of adjacent column sections set in step (c), said opposite parallel edge portions of said panels extending along adjacent column sections and with the panels extending at least near to the top of the adjacent column sections;
(e) attaching the panels to the adjacent column sections;
(f) forming piers of cementitious material about the columns with the anchors of step (a) embedded in the cementitious pier material, thereby connecting adjacent panels about said perimeter and said column sections and adjacent panels with said cementitious piers;
(g) erecting upper column sections extending from the column sections of step (c);
(h) repeating steps (d) through (g), wherein step (f) includes the steps of positioning forms about the last erected column sections and extending the forms to a height just below the top of the column sections for allowing the next higher column sections to be connected to the encased column sections, wherein the preforming step (a) includes the steps of providing tapered wedges, which form predetermined included angles, arranged along the spaced, coextending edges of the panels and orienting the wedges to point toward the edge of the panel associated therewith and step (e) includes the step of welding the wedges to the column sections.

4. A method as set forth in claim 3 wherein the setting step (c) and the placing step (d) include the steps of orienting the column sections and panels for forming a hyperboloid.

5. A method as set forth in claim 4 wherein the preforming step (a) includes the steps of providing scaffold anchoring inserts in the panels accessible from the outer sides thereof and also providing brace mounting inserts in the panels for holding the panels aligned with the adjacent column sections until the panels are attached to the column sections and with the brace mounting inserts also accessible from the outer sides of the panels.

6. A method as set forth in claim 1 wherein the preforming step (a) includes the steps of providing tapered wedges, which form predetermined included angles, arranged along the spaced, coextending edges of the panels and orienting the wedges to point toward the edge of the panel associated therewith and step (e) includes the step of welding the wedges to the column sections.

7. A method as set forth in claim 1 wherein the setting step (c) and the placing step (d) include the steps of orienting the column sections and panels for forming a hyperboloid.

8. A method as set forth in claim 1 wherein the preforming step (a) includes the steps of providing scaffolding anchoring inserts in the outer sides of said panels and brace mounting inserts in the outer sides of said panels for holding the panels in position until they are attached to the adjacent column sections.

9. A natural draft cooling tower construction comprising in combination:
(a) a base for a veil;
(b) an initial lower course of peripherally spaced column sections affixed to the base and extending upwardly therefrom at predetermined angles and points spaced about the perimeter of a generally circular area defined by said base;
(c) a plurality of successive upper courses of spaced column sections with each successive course of column sections connected to and extending upward from the course of column sections disposed therebelow;
(d) a plurality of courses of preformed panels arranged filling in the spaces between the column sections of each course of sections and with each panel substantially spanning the distance between the vertical center lines of a pair of adjacent column sections, said panels including inner and outer sides, opposite generally parallel edge portions and anchors projecting outwardly from the outer sides of said panels along the opposite generally parallel edge portions thereof, said parallel edge portions of adjacent panels in each course of panels overlapping the inner side of the corresponding column section and said anchors being spaced outwardly of the corresponding opposite sides of the corresponding column section; and
(e) a cementitious pier at least substantially encasing each column section on the outer sides, only, of the adjacent panels and having the anchors of the adjacent panels embedded therein.

10. The combination of claim 9 wherein the outer side surfaces of said panels have scaffold anchoring and brace mounting inserts embedded therein.

11. A structure as defined in claim 9 wherein the adjacent edge portions of the panels in each course of panels extending along the corresponding column sections are slightly spaced apart, a compressive seal being formed between said slightly spaced apart edges, at least adjacent the inner sides of adjacent panels.

* * * * *